(12) United States Patent
Oztaskent et al.

(10) Patent No.: US 8,196,164 B1
(45) Date of Patent: Jun. 5, 2012

(54) DETECTING ADVERTISEMENTS USING SUBTITLE REPETITION

(75) Inventors: Ant Oztaskent, Surrey (GB); Yaroslav Volovich, Cambridge (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/275,025

(22) Filed: Oct. 17, 2011

(51) Int. Cl.
*H04N 7/025* (2006.01)

(52) U.S. Cl. ............... 725/32; 725/137; 725/34; 725/36

(58) Field of Classification Search .................. None
See application file for complete search history.

(56) References Cited

U.S. PATENT DOCUMENTS

2002/0120929 A1* 8/2002 Schwalb et al. ............... 725/32
2005/0028194 A1* 2/2005 Elenbaas et al. ............... 725/32
2008/0267584 A1* 10/2008 Green ............................. 386/95

OTHER PUBLICATIONS

Covell et al., 'Advertisement Detection and Replacement using Acoustic and Visual Repetition.' [online],[retrieved Jun. 3, 2011] Retrieved from the Internet: http://static.googleusercontent.com/external_content/untrusted_dlcp/research.google.com/en/us/pubs/archive/55.pdf.

* cited by examiner

*Primary Examiner* — Brian Pendleton
*Assistant Examiner* — Cai Chen
(74) *Attorney, Agent, or Firm* — Fish & Richardson P.C.

(57) ABSTRACT

Methods, systems, and apparatus, including computer programs encoded on a computer storage medium, for identifying advertisements in television broadcasts. In an aspect, a method includes identifying caption data that has been received at least a threshold number of times and received over at least a threshold number of channels as repeated caption data, selecting video frames indexed at times and channels that that correspond times and channels of the repeated caption data, providing the selected video frames to a video processing system that identifies advertising objects in the video frame data and receiving from the video processing system the advertising objects, and for each advertising object, associating the advertising object with the repeated caption data having times and channel indices that match the time and channel index of the video frame from which the advertising object was identified.

22 Claims, 6 Drawing Sheets

DETECTING ADVERTISEMENTS USING SUBTITLE REPETITION

TECHNICAL FIELD

This instant specification relates to the identification of promotion content.

BACKGROUND

Television advertising is one of the most prevalent advertising strategies in use today. Each television advertising campaign may have different strategies, such as brand recognition lift, increasing sales, and the like. However, regardless of the strategy, television advertisers must rely on viewers, who are potential customers, remembering their advertisement or brand when shopping. Furthermore, because television advertisements are often broadcast to a large audience, the advertisers often cannot connect a particular product or service sale with a particular customer or airing of an advertisement.

Accordingly, it is difficult for advertisers to quantify the effect of their television advertisements on driving sales or meeting other objectives. From the viewer/potential customer standpoint, if one sees a product of interest, he or she must remember the product or take action to write down the product name, etc., for later reference. Furthermore, once a television advertisement is created, the options for providing dynamic or supplemental advertising content with the advertisement are limited. For example, a particular product that is being advertised on television may have just been awarded a major consumer product award and be the subject of a very favorable review. However, a television advertisement created for the product prior the product receiving the award cannot be supplemented with additional content describing the aware and the review.

SUMMARY

In general, this document describes technologies relating to systems and methods for the identification of advertisements and other promotional materials through analysis of subtitles and images drawn from television advertisement broadcasts.

In general, one innovative aspect of the subject matter described in this specification can be embodied in methods that include the actions of receiving television broadcast data for a plurality of television channels, the television broadcast data having programming portions during which television programming is aired, and advertising portions during which advertisements are aired, and including caption data that includes text that corresponds to audio content of the programming portions and advertising portions and frame data defining video frames; storing the caption data in a data store and indexing the caption data by time and channel, the time corresponding to a time the caption data was received in the broadcast data and the channel specifying a channel on which the stored caption data was provided in the broadcast data; storing frame data of video frames in the data store and indexing each video frame by time and channel, the time corresponding to a time the video frame was received in the broadcast data and the channel specifying a channel on which the video frame was provided in the broadcast data; identifying, from the caption data in the data store, caption data that has been received at least a threshold number of times and received over at least a threshold number of channels as repeated caption data; identifying, from the index times and channels of the repeated caption data, the advertisement portions of the broadcast data; selecting video frames indexed at times and channels that that correspond to the times and channels of the advertisement portions; providing the selected video frames to a video processing system that identifies advertising objects in the video frame data and receiving from the video processing system the advertising objects; and for each advertising object, associating the advertising object with the repeated caption data having times and channel indices that match the time and channel index of the video frame from which the advertising object was identified. Other embodiments of this aspect include corresponding systems, apparatus, and computer programs, configured to perform the actions of the methods, encoded on computer storage devices.

In general, another innovative aspect of the subject matter described in this specification can be embodied in methods that include the actions of receiving, by at computer device, a multimedia program, the multimedia program including program portions and one or more advertising portions; obtaining, by the computer device, identifying information from the multimedia program; storing the identifying information; processing, by the computer device, the stored identifying information to detect repeated portions of the identifying information; and identifying, by the computer device, the repeated portions of the identifying information as being representative of one or more of the advertising portions. Other embodiments of this aspect include corresponding systems, apparatus, and computer programs, configured to perform the actions of the methods, encoded on computer storage devices.

The systems and techniques described here may provide one or more of the following advantages. The subject matter addresses the technical problem of supplementing only a certain data type (e.g., only caption data for commercials) with additional data from a different data type (e.g., advertising objects from image derived from image processing of video information presented synchronously with the caption data). In the context of television advertising, this yields numerous advantages. First, a system can provide revenue-generating advertising channels that compliment broadcast advertisements. Second, the system can provide viewers with convenient gateways to sources of information about goods and services being advertised to them on television in near real-time. Third, the system can make use of display devices other than the one being used to display broadcast advertisements in order to deliver complimentary advertisements to the viewer. Fourth, additional supplemental advertising content can be provided to consumers at very little marginal cost to the advertiser.

The details of one or more implementations are set forth in the accompanying drawings and the description below. Other features and advantages will be apparent from the description and drawings, and from the claims.

DETAILED DESCRIPTION

Figure 1:
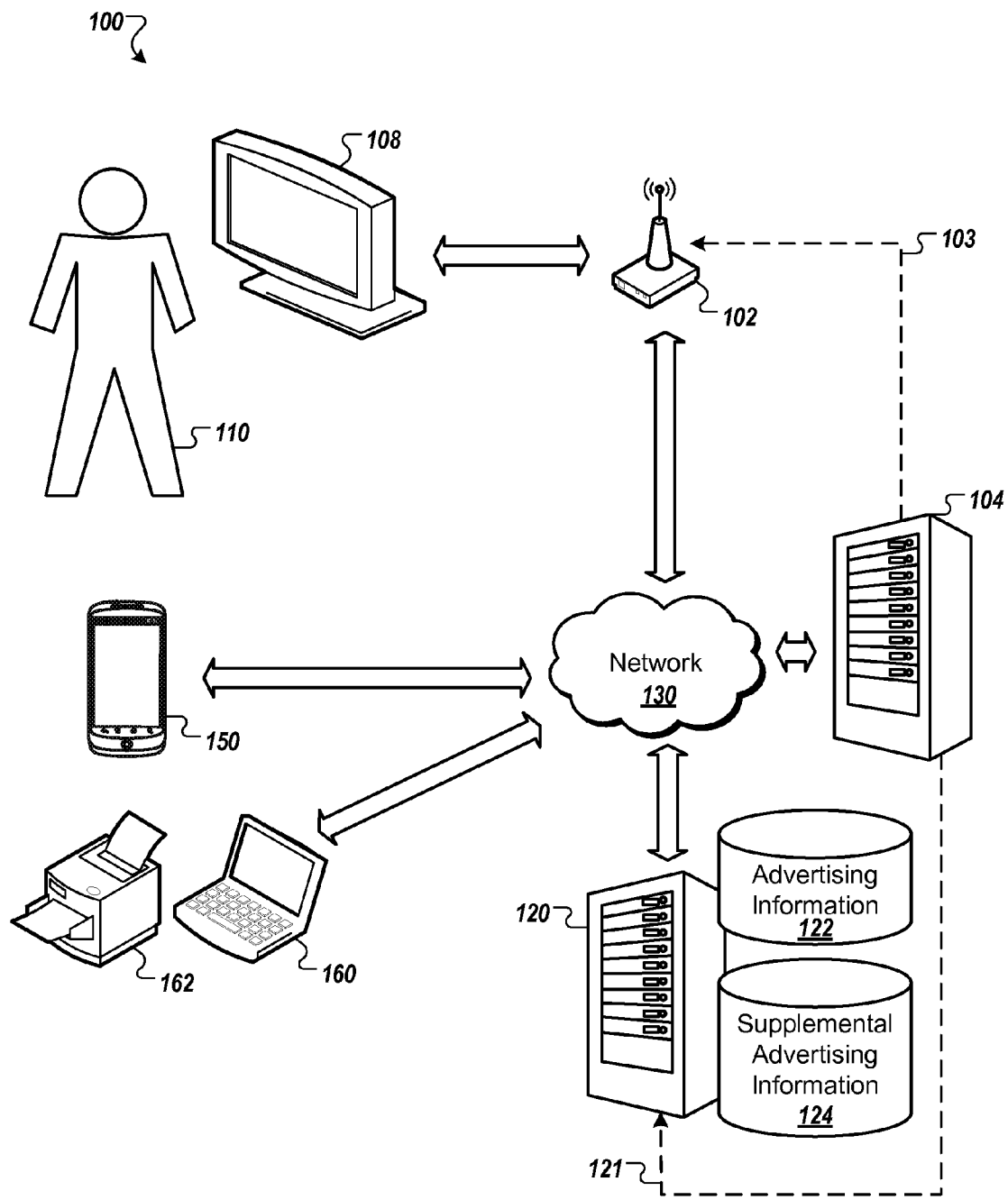
FIG. 1 is a block diagram of an example system that facilitates the distribution of television advertisements.

This document describes systems and techniques for identifying television advertisement content (e.g., broadcast commercials). Such advertisements generally include video and audio that describes or otherwise promotes a particular product, service, event, person, or cause. Such advertisements generally also include caption data (e.g., closed caption text, subtitles, and the like) that textually describe the content of the audio track. The caption data can be analyzed by a television processing device to determine the subject of the advertisement.

Some television advertisements, however, may not actually include content in the audio track that is sufficient to identify the subject of the commercial. For example, a commercial for an upcoming movie may simply show a montage of clips from the film without audibly including the name of the film itself. In another example, a sports drink commercial may be substantially free of dialog, and present substantially only images of athletes performing feats of skill while drinking the product that the commercial is meant to promote. In examples such as these and others, the caption data may not include an identifying reference to the subject of the commercial.

In examples such as these and others in which the audio track and caption data may not include enough information to directly identify the subject of the advertisement, the video portion can be analyzed (e.g., optical character recognition, logo detection) to determine the identity of the promoted subject, and associate that identity with the commercial's caption data. For example, in the aforementioned movie commercial, the video track may be analyzed using optical character recognition to determine the name of the film from a title that was displayed at some point. The name is then associated with the subtitle text, so that the subject of the commercial can be later identified again based on an identification of the subtitle text. In another example, the aforementioned sports drink commercial's video content may be analyzed to recognize a logo shown (e.g., on the drink bottle) to identify the subject product of the commercial. The identity of the product, and other product information, such as a website URL for the product, is then associated with the subtitle text of the commercial such that the product and other information can later be identified again from an identification of the subtitle text.

The identification of television advertisements during broadcasts can be used to enhance or extend the promotion of the advertised products, services, and other subjects. In some implementations, a broadcast processing system analyzes broadcast data to identify caption data information about the broadcast, e.g., by extracting closed captioning text. As television commercials are repeated over multiple channels multiple times, the system identifies caption data that has been repeated over multiple channels multiple times as television commercial caption data. The caption data are indexed by time and channel, and for each occurrence of caption data that is identified as television commercial caption data, video frames are analyzed from a video processing system to detect advertising objects (e.g., logos, text from optical character recognition, brand names, etc.). The advertising objects are used as supplemental advertising content, and can also be used to find other supplemental advertising content, such as web site URLs for a product, coupons for a product, etc. The association of television commercial caption data and advertising object data are stored as advertising information.

During a broadcast, the caption data of a broadcast feed are compared to the advertising information. When the incoming caption data matches caption data that has been determined to be television advertising data, the caption data and the advertising objects are used to identify supplemental advertisement data (e.g., electronic coupons, web site URLs, images, etc.). The server device provides the supplemental advertising information in a variety of ways, such as by providing additional advertisements and/or promotional material (e.g., coupons) to a television receiver, or to other devices or accounts associated with the viewer of the television receiver (e.g., to the viewer's smartphone, computer, tablet computer).

FIG. 1 is a block diagram of an example system 100 that facilities the distribution of promotion content. A television broadcast system is described, but other broadcast systems can also be used.

The system 100 includes a television processing device 102. In some implementations, the television processing device 102 can include a data processing subsystem, and a memory storage device storing instructions executable by the data processing subsystem, the instructions defining a promotion content module.

The television processing device 102 receives television advertisement content (e.g., television programming and commercials) from a broadcaster 104. In some implementations, the broadcaster 104 can be a cable television provider, a satellite television provider, an Internet protocol television (IPTV) provider, or any other appropriate source of the television advertising content. The broadcaster 104 may be any system capable of providing the television advertising content to the television processing device 102.

The television processing device 102 processes the television advertising content for display by a display device 108 (e.g., a television). In some implementations, the television processing device 102 can be a stand-alone device (e.g., a "set-top" box) in communication with the display device 108. In some implementations, the television processing device 102 may receive the television programming content from a source other than the broadcaster 104. For example, a channel tuning device (e.g., cable box, satellite receiver) can provide the television content to the television processing device 102. In another example, television processing device 102 can receive the television or other video content from a video playback device (e.g., digital video recorder, DVD player, Blu-Ray player, streaming video receiver). In some implementations, the television processing device 102 can include channel tuning or content playback functions. In some implementations, the television processing device 102 can be integrated as part of the display device 108.

Accordingly, depending on the television processing device 102 implementation, the television processing device 102 can receive broadcast data over the network 130 or by a separate data communication path 103 (e.g., satellite feed, a cable feed separate from the network 103, etc.).

An advertising processing system 120 processes the broadcast stream provided by the broadcaster 104. The system 120 includes advertising information 122 that is an association of advertising objects detected from video frames corresponding to repeated caption data that is determined to be television advertising caption data. The system 120 and the advertising information are described in more detail with respect to FIG. 3.

In some implementations, the system 120 can be part of the broadcaster 104; in other implementations, the system 120 can be managed by separate entities. In these latter implementations, depending on the system 120 implementation, the system 120 can receive broadcast data over the network 130 or by a separate data communication path 121 (e.g., satellite feed, a cable feed separate from the network 103, etc.).

In some implementations, the system 120 has access to television accounts of customers. Each television account is for a corresponding user and specifies one or more electronic accounts associated with the corresponding user. For example, for a particular user, the user's television account information may be associated with another electronic account of the user that can be used to receive advertising content, such as an e-mail account.

The system 120 receives the caption data of a broadcast feed and compares it to the advertising information 122. When the incoming caption data matches caption data that has been determined to be television advertising data, the caption data and the advertising objects are used to identify supplemental advertisement data (e.g., electronic coupons, web site URLs, images, etc.). The supplemental advertising information can, for example, be stored in an electronic advertising content 124 data store, or, alternatively, search for the supplemental advertising information from among advertisement providers (not shown) in data communication over the network 130.

In some implementations, the supplemental advertising information is provided for conjunctive display with the broadcast data on a television device 108, such as describe with reference to FIG. 2 below. For example, when the system 120 identifies electronic advertisement content that is associated with the television advertising content, the system 120 transmits the electronic advertisement content to the television processing device 102. In response to receiving such electronic content, the television processing device 102 displays the electronic advertisement content on the display device 108.

In some implementations, the system 120 associates the electronic advertising content 124 with the television account, which, in turn, allows for the electronic advertising content 124 to be distributed to the user's electronic account(s). The system 120 provides the electronic advertising content 124 to user devices that can receive data for the user accounts, such as a user device 150 (e.g., a smart phone or pad computer) and the computer device 160 which will be described further below. In particular, for each television account, the system 120 transmits the electronic advertising content 124 associated with the television account to the electronic accounts with which the television account is associated.

For example, the system 120 may transmit the electronic advertisement content 124 to the user device 150 or the computer device 160. For example, the user 110 may watch television while also working on his laptop computer, and when the user 110 sees a commercial on television he may also receive an advertisement for substantially the same product on his laptop.

In some implementations, the advertisements presented to the user 110 through the user device 150 or the computer device 160 may be influenced by the television advertisement content 160 the user is watching or has recently watched. For example, the user 110 may see a commercial on television, and a few minutes later perform a web search from his laptop computer. The system 120 may detect the search, and also detect that the system 120 has identified a television commercial that was recently presented by the user's television processing device 102. The system 120 may then include the electronic advertisement content 124, associated with the earlier-presented commercial, with later-presented search results.

Figure 2:
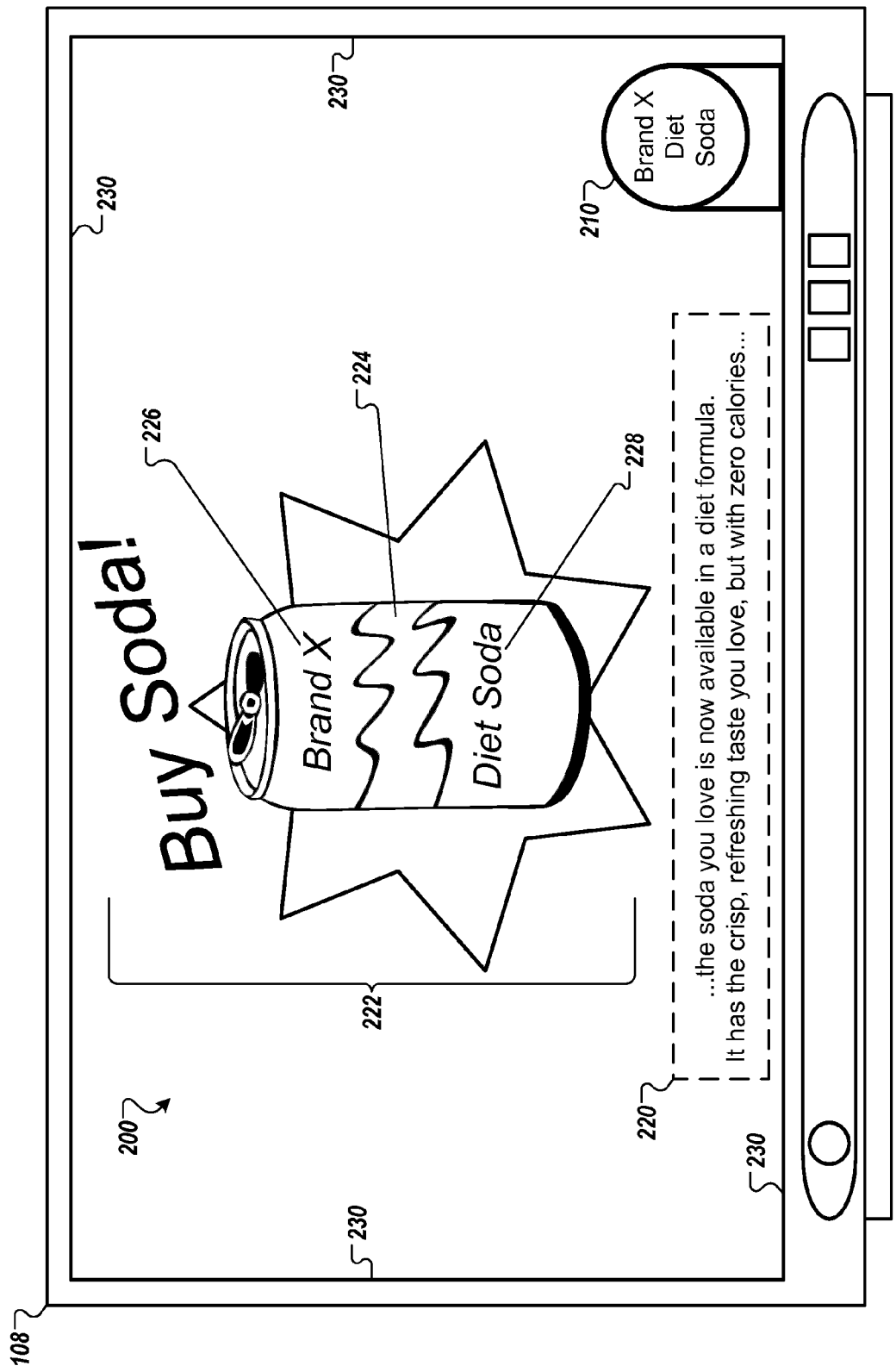
FIG. 2 shows a display device presenting an example television advertisement and an example promotion content notification.

FIG. 2 shows the display device 108 presenting an example television commercial 200 and an example electronic advertisement content 210. In the illustrated example the television commercial 200 is a soda commercial that is presented as part of the television advertising content received by the television processing device 102. The television commercial 200 includes closed caption subtitles 220 and images 222. The images 222 include a product logo 224, a collection of brand-identifying graphics 226, and a collection of product-identifying graphics 228. In some implementations, a viewer may configure the display device 108 or the television processing device 102 to display or hide the closed caption subtitles 220, but in either case, the subtitles 220 are available to the system 120.

The server system uses the transmitted caption data 220 to search the advertising information 122. As will be explained in referent to FIG. 3, the caption data 220, while not including the term "Brand X", is used to search the advertising information 122 to determine the identity of the subject matter of the television commercial 200 (e.g., Brand X diet soda), and, if available, supplemental electronic advertisement content that an advertiser may make available to viewers of the commercial 200. The advertiser, for example, may have specified with the system 102 that electronic advertisement content is available for Brand X diet soda. The system 120 provides the television processing device 102 with the supplemental electronic advertisement content, and in response, the electronic advertisement content 210 is displayed.

When the transmitted subtitles 220 do not include information sufficient to identify the subject matter of the television commercial 200, the server may use previously processed subtitles and video information to identify the subject of the advertisement. For example, the system 120 may have previously processed the television commercial 200 to identify the logo 224, the brand-identifying graphics 226, and/or the product-identifying graphics 228 as identifying "Brand X Diet Soda." Examples of such server operations are discussed in the descriptions of FIGS. 3-5.

In some implementations, the electronic advertisement content 210 can be superimposed over a region of the visible area of the display device 108. For example, the electronic advertisement content 210 can be presented as an icon in a corner of the visible area, or as an information bar along an edge 230 of the visible area of the display device 108.

Figure 3:
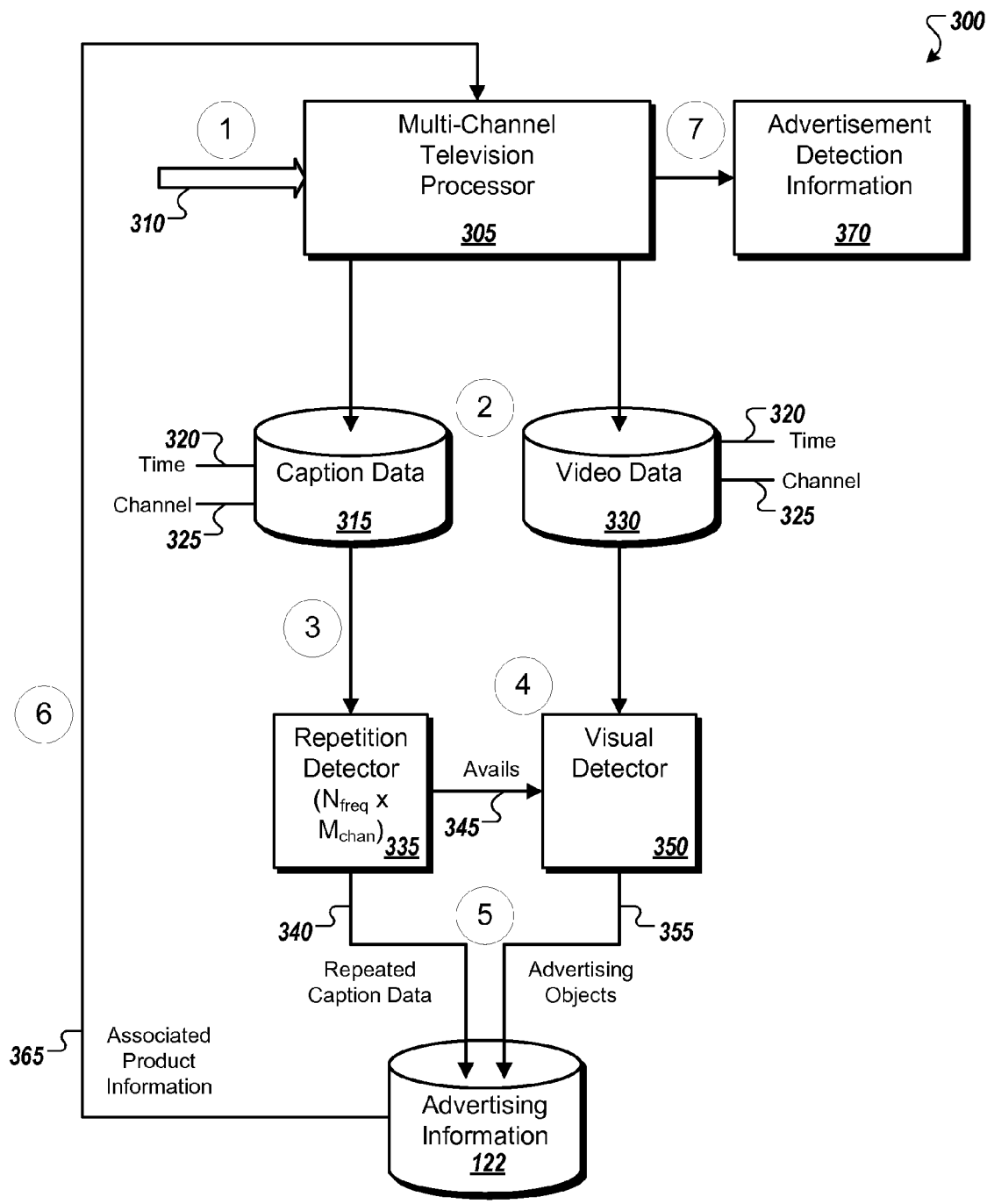
FIG. 3 is a block diagram of an example system for the identification of television advertisements.

FIG. 3 is a block diagram of an example system 300 for the identification of television advertisements. In some implementations, the system 300 can be the system 120 of FIG. 1. An example process flow for generating the advertising information 122 and using the information 122 to provide supplemental content is described in a series of distinct stages. However, the process flow may be accomplished in other stages that differ from the example stages described.

At stage (1), a multi-channel television processor 305 receives television broadcast data 310. The television broadcast data 310 includes television programming content (e.g., shows) and television advertisement content such as the television advertisement content for multiple channels. The television broadcast data includes programming portions during which television programming is aired, advertising portions during which advertisements are aired, and caption data that includes text that corresponds to audio content of the programming portions and advertising portions.

A multi-channel television processor 305 includes one or more television channel processors that can receive and decode the television broadcast signals 310 (e.g., television channel tuners) and extract video data (e.g., video frames), caption data, channel data (e.g., station identifiers), time, and other appropriate data that can be extracted from or associated with a television signal.

At stage (2), the multi-channel television processor 305 stores the caption data in a caption data repository 315. Time information 320 is stored and provides time information (e.g., time/date stamps) for the caption data. The channel data 325 is stored along with the caption data. The caption data repository 315 is one or more databases, tables, lists, files, or other appropriate storage formats for the caption data, time information, and channel information. Together caption data 315 describes caption data text, the time corresponding to a time the caption data was received in the broadcast data and the channel specifying a channel on which the caption data was provided in the broadcast data.

Also at stage (2), the multi-channel television processor 305 stores video data in a video data repository 330. Time data 320 and channel data 325 are also used to index the video data. The video data repository 330 is one or more databases, tables, lists, files, or other appropriate storage formats for the video data, time information, and channel information. For example, the video data 330 may be sampled frame data of video frames, each indexed by time and channel, the time corresponding to a time the video frame was received in the broadcast data and the channel specifying a channel on which the video frame was provided in the broadcast data.

At stage (3), a repetition detector module 335 accesses and analyzes the content of the caption data repository 315. The repetition detector module 335 is configured to detect sequences of caption data that are repeated, for example, to detect that a particular phrase or dialogue has been identified 'N' times across 'M' channels, where both N and M are greater than 1. In some implementations, the repetition detection module 335 can detect when a sequence of caption data has been repeated a predetermined number of times across a predetermined number of channels, during a predetermined period of time. For example, the repetition detector module 335 can determine that a sequence of dialogue has been repeated 'N' times across 'M' channels during the previous 'Z' days. This is a strong signal that the caption data is television commercial caption data, as television commercials are more frequently on different channels that programming that is separate from the advertising.

For example, a 30-second commercial is generally replayed many times and across various channels. By repeatedly receiving, extracting, storing, and detecting the multiple occurrences of the repeated caption data that is broadcast along with the commercial, the repetition detector 335 identifies the caption data as being derived from a commercial.

Channel information, and start and end times of sequences of detected repeated caption data, are identified by the repetition detector module 335 as a collection of available sequences 345. In some implementations, the channel and time information included in the collection of available sequences 345 can identify the time-wise and channel-wise locations of advertising information that was previously broadcast. The available sequences 345, or "avails" (advertisement availabilities, advertisement slots, advertisement pods, etc.), correspond to the advertisement portions of a broadcast, and are considered separate from the programming portions of the broadcast.

In some implementations, the length of the caption data can also be used in the identification of caption data that is derived from television advertisements. For example, many commercials are broadcast with 15, 30, or 60 second durations, whereas television programming content is generally broadcast several minutes at a time substantially without commercial interruption. In some implementations, the length of a sequence of repeated caption data can be used to separate advertisement content from repeated programming content (e.g., television re-runs).

The repetition detector module 335 can determine a collection of caption data as repeated caption data 340. The repeated caption data 340 is caption data that has been received at least a threshold number of times and received over at least a threshold number of channels. The repeated caption data 340 is stored in the advertisement information 122.

However, the repetition detector module 335 may not be able to determine what products or services are being advertised directly from the repeated caption data. For example, the commercial from which the sequence was obtained may not include a transcription or description of the product being promoted. Thus, additional information such as the video data may be used to determine product information that can be associated with the sequence of caption data.

At stage (4), the visual detector module 350 accesses the video data repository 330 to retrieve video data that corresponds to the information included in the collection of available sequences 345 received from the repetition detector module 335. For example, an available sequence may be identified as having been broadcast from 4:27:30 pm until 4:29:00 pm on channel "360", and the visual detector module 350 can retrieve a collection of video frames captured during that same 90 seconds and from that same television channel. Thus, the video frames indexed at times and channels that that correspond to the times and channels of the advertisement portions are selected.

The selected video frames are provided to the visual detector 350 processing system that identifies advertising objects in the video frame data. The visual detector module 350 processes the video data to determine a collection of advertising objects, such as an identity of the subject of an advertisement. In some implementations, the visual detector module 350 can perform optical character recognition (OCR), logo detection, pattern matching, or any other appropriate form of image processing to identify visual features of the video data that may identify the subject of the advertisement from which the video data was obtained. For example, the visual detector module 350 may identify an advertising object in the form of the text "Air X Airlines" as being printed across the image of an aircraft fuselage and provide that information for association with the repeated caption data having times and channel indices that match the time and channel index of the video frame from which the advertising object was identified.

At stage (5), the advertising objects are provided by the visual detector 350 to for association in the advertising information 122. In some implementations, the advertising objects can be company names, product names, or other information determined from the video data that can identify the subject of the television advertisement content.

The advertising information 122 is one or more databases, tables, lists, files, or other appropriate types of digital data storage. The collection of repeated caption data 340 and advertising objects are associated with each other as a collection of associated advertising information 122.

At stage (6), the associated advertising information 122 is provided to the multi-channel television processor 305, which continues to process incoming broadcast data. The multi-channel television processor 305 uses the additional television broadcast signals 305 and the collection of associated advertising information 365 to identify the subjects of television advertisement content included in the additional television broadcast data 310. Thus, once enough advertising information 360 is stored, advertisements can then be detected in real time from a broadcast stream by their matching caption data stored in the advertising information 122. Then the additional product information can be used to provide supplemental advertising content.

At stage (7) data describing the times, channels, identified subjects, and other appropriate advertising data is provided in the form of advertisement detection information 370.

For example, the processor 305 can receive caption data from a broadcast stream, identify previously received caption data that substantially matches the caption data received, and identify the subject of the advertisement that was previously associated with the previously received caption data. As such, the caption data received for a commercial need not include a literal identification or description of the subject of the advertisement, and the subject of the advertisement can be identified from the collection of advertising objects 355 previously associated with the repeated caption data identified during previous airings of the commercial.

In some implementations, the products, services, events, and other such subjects of television advertisement content identified by the advertisement detection information 370 can be used in a process for the distribution of electronic advertisement content and/or promotional content. For example, the system 120 can provide electronic advertisement content to the television processing device 102 for display on the display device (e.g., the electronic advertisement content 210 of FIG. 2). In another example, the system 120 can identify an electronic coupon pertaining to the subject of the commercial, and provide the coupon to the user device 150 or send the coupon to the user's 110 email account.

Figure 4:
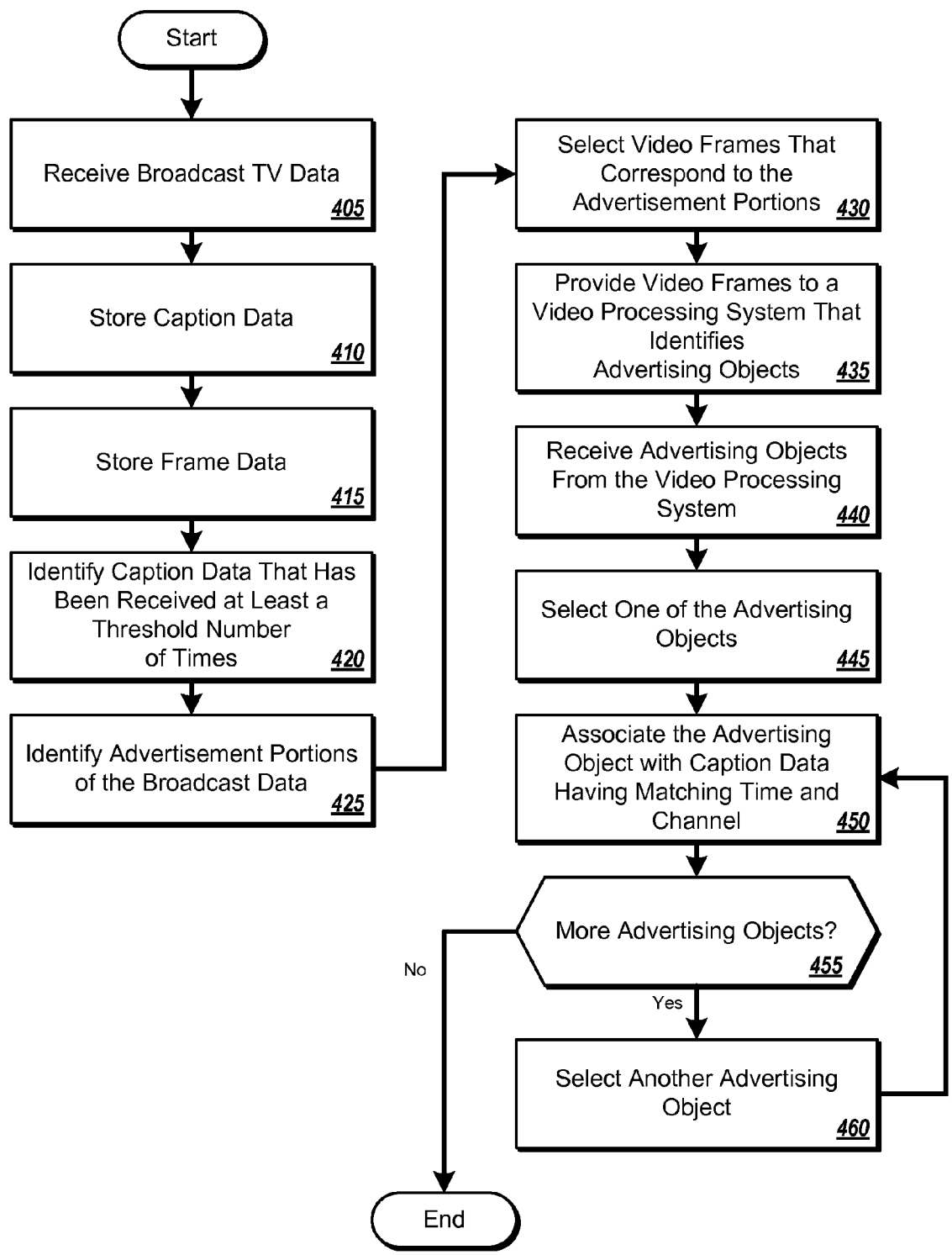
FIGS. 4 and 5 are flow diagrams of example processes for the identification of television advertisements.

FIG. 4 is a flow diagram of an example process 400 for the identification of television advertisements. In some implementations, the process 400 may be performed by the system 120 of FIG. 1 or by the system 300 of FIG. 3.

At step 405, television broadcast data for a collection of television channels is received. The television broadcast data includes programming portions during which television programming is aired and advertising portions during which advertisements are aired. The television broadcast data includes caption data that includes text that corresponds to audio content of the programming portions and advertising portions, and to frame data defining video frames. For example, the multi-channel television processor 305 receives the television broadcast data 310, which includes audio, video, and subtitle caption data for television programming content and television advertisement content.

At step 410 the caption data is stored in a data store, and the caption data is indexed by time and channel. The time corresponds to a time the caption data was received in the broadcast data, and the channel specifies a channel on which the stored caption data was provided in the broadcast data. For example, the caption data is stored in the caption data repository 315 along with the time information 320 and the channel information 325.

At step 415 the frame data of video frames is stored in a data store, and the frame data is indexed by time and channel. The time corresponds to a time the frame data was received in the broadcast data, and the channel specifies a channel on which the video frame was provided in the broadcast data. For example, the video data is stored in the video data repository 330 along with the time information 320 and the channel information 325. In some implementations, the caption data repository 315 and the video data repository 330 can be a shared data repository.

At step 420 the caption data is identified from the caption data in the data store. The caption data in the data store is caption data that has been received at least a threshold number of times and received over at least a threshold number of channels as repeated caption data. For example, the repetition detector 335 can determine that substantially the same caption data has been received by the multi-channel television processor 305 more than ten times across each of twenty different channels. The repetition detector 335, in response to the determination, identifies the caption data as repeated caption data.

At step 425, advertisement portions of the broadcast data are identified from the index times and channels of the repeated caption data. For example, the available sequences 345 identify channels and time periods that have been detected as including repeated caption data, and are therefore identified as being indexed times and channels in which commercials were aired.

In some implementations, for each channel, sets of contiguous index times of the repeated caption data are identified, and each set is padded by a beginning padding time and ending padding time. This ensures that all caption data and video frame for a particular commercial or commercials are captured.

At step 430, video frames indexed at times and channels that that correspond to the times and channels of the advertisement portions are selected. For example, the visual detector 350 can access the video data repository 330 to retrieve frames of video that are indexed as having been broadcast during substantially the times and on substantially on same the channels as the identified advertisement portions.

At step 435, the selected video frames are provided to a video processing system that identifies advertising objects in the video frame data. For example, the visual detector module 350 processes the video data to identify text, symbols, logos and other appropriate forms for visual information as the advertising objects. At step 440, the advertising objects are received from the video processing system.

At step 445, one of the advertising objects is selected, and at step 450 the advertising object is associated with the repeated caption data having times and channel indices that match the time and channel index of the video frame from which the advertising object was identified. For example, the closed caption subtitles 220 of FIG. 2 may be identified as repeated caption data, and the caption data of the closed caption subtitles 220 can be associated with the collection of advertising objects obtained from an analysis of the images of the product logo 224, the collection of brand-identifying graphics 226, and the collection of product-identifying graphics 228.

If at step 455 more advertising objects remain to be associated with repeated caption data, then another advertising object is selected at step 460 and the advertising objects are associated with repeated caption data at step 450. If at step 455 no more advertising objects remain to be associated with repeated caption data, then the process 400 ends.

Figure 5:
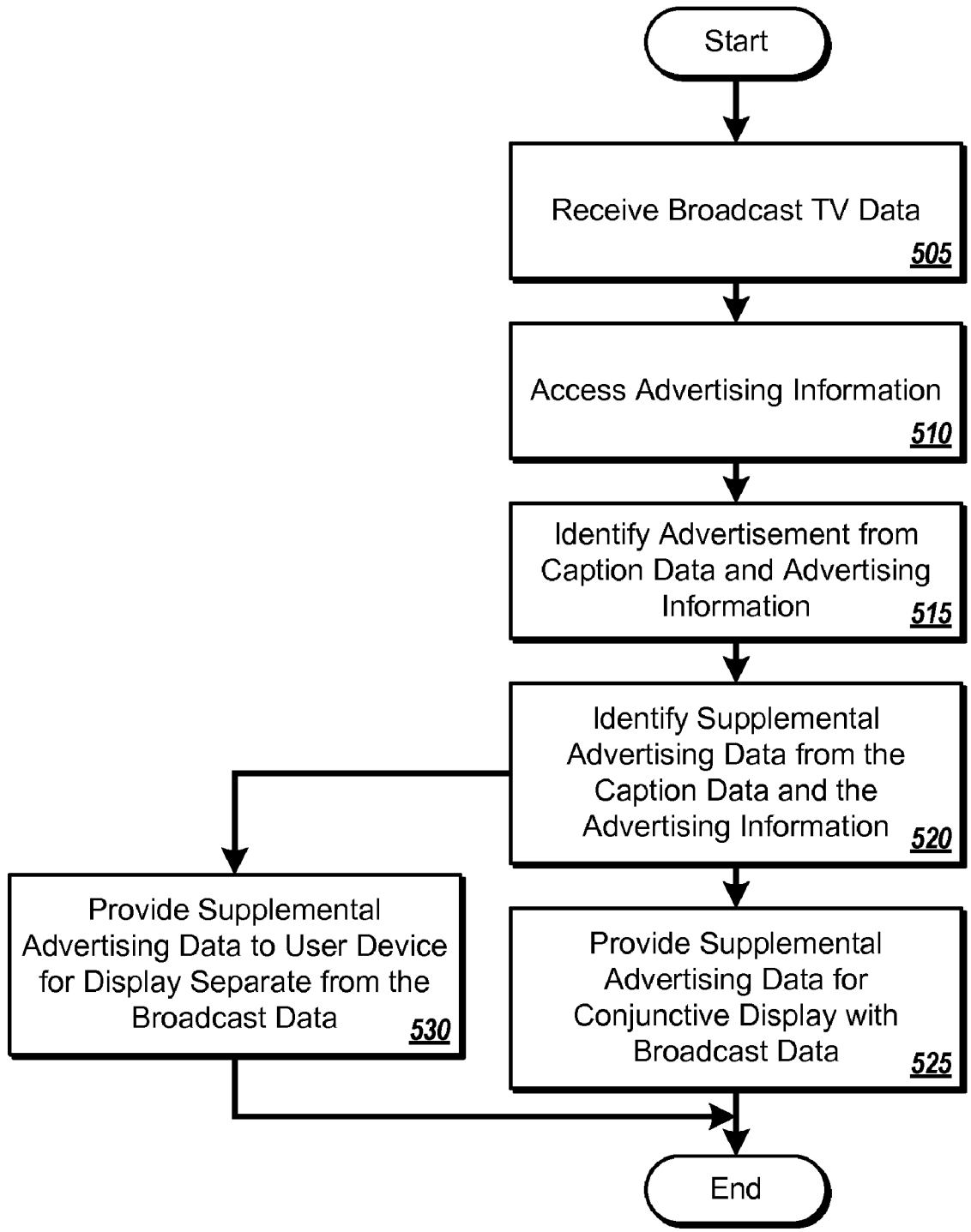

FIG. 5 is a flow diagram of an example process 500 for the identification of television advertisements. In some implementations, the process 500 may be performed by the system 120 of FIG. 1 or by the system 300 of FIG. 3. In some implementations, the process 500 may be performed in addition to the process 400 of FIG. 4.

At step 505, television broadcast data for a collection of television channels is received. For example, the multi-channel television processor 305 can receive the television broadcast data 310, which includes audio, video, and subtitle caption data for television programming content and television advertisement content.

At step 510, advertising information is accessed. For example, the multi-channel processor 305 can compare the caption data from the received television broadcast data (e.g., the television advertising content) to the association of the advertising object and repeated caption data in the advertising information.

At step 515, an airing of an advertisement in the broadcast data is identified from a match of repeated caption data to the caption data of the broadcast data. For example, if substantially matching caption data is identified from the data in the advertising information 122, then the broadcast data from which the caption data was obtained can be identified as being an advertisement (e.g., a commercial).

At step 520, supplemental advertising information is identified from the matching repeated caption data and the advertising object data associated with the matching repeated caption data. For example, the system 120 may identify electronic advertisement data (e.g., banner ads, text ads, commercial multimedia clips) such as the electronic advertisement content 210 of FIG. 2 that corresponds to the subject of the television commercial 200.

At step 525, the supplemental advertising data is provided for conjunctive display with the broadcast data. For example, the electronic advertisement content 210 is presented on the display device 108 along with the television commercial 200. In some implementations, the supplemental advertising data can be provided for conjunctive display on a device other than the one displaying the broadcast data.

In some implementations, the supplemental advertising data is provided to a user device for display separate from the broadcast data (step 530). For example, the user device 150 (and/or 160) can receive supplemental advertising data (e.g., electronic coupons, e-mails with links to the advertiser's website, etc.) for later display.

In some implementations, the supplemental advertising data can be provided in response to caption data provided by a television processing device 102. For example, the television processing device 102 can be used by the user 110 to select and process broadcast streams for viewing on the television device 108. As a part of the processing, the television processing device 102 can extract caption data from the selected broadcast stream and transmit the caption data to the system 120. The broadcast stream can include the television commercial 200, which includes the closed caption subtitles 220. The device 102 transmits the closed caption subtitles 220 to the system 120 as the caption data. The system 120 uses the caption data received from the television processing device 102 to search the advertising information 122.

For example, the television processing device 102 strips closed caption subtitles 220 from the broadcast data of the channel to which the device 102 is tuned to, and provides the caption data to the system 120. The received caption data can be identified by the system 120 as corresponding to caption data that was previously captured, processed, and identified by the system 120, and the system 120 can identify the received caption data as corresponding to the television commercial 200 and the supplemental advertising data. In response to the identification by the system 120 of the correlation between the closed caption subtitles 220 and the supplemental advertising data, the system 120 can transmit the supplemental advertising data to the television processing device 102. The television processing device 120 can then display the supplemental advertising data as the electronic advertisement content 210. In some implementations, the electronic advertisement content 210 can be provided to the television processing device 102 such that the electronic advertisement content 210 can be displayed while the television commercial 200 is still being displayed.

Finally, although the examples are described above in the context of caption data for broadcast data, the system can be applied to any multimedia feed that includes metadata. In particular, as long as the metadata includes sufficient identifying information for the portion of the multimedia data to which it corresponds, it can be used to identify corresponding repeated portions of multimedia data.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 6:
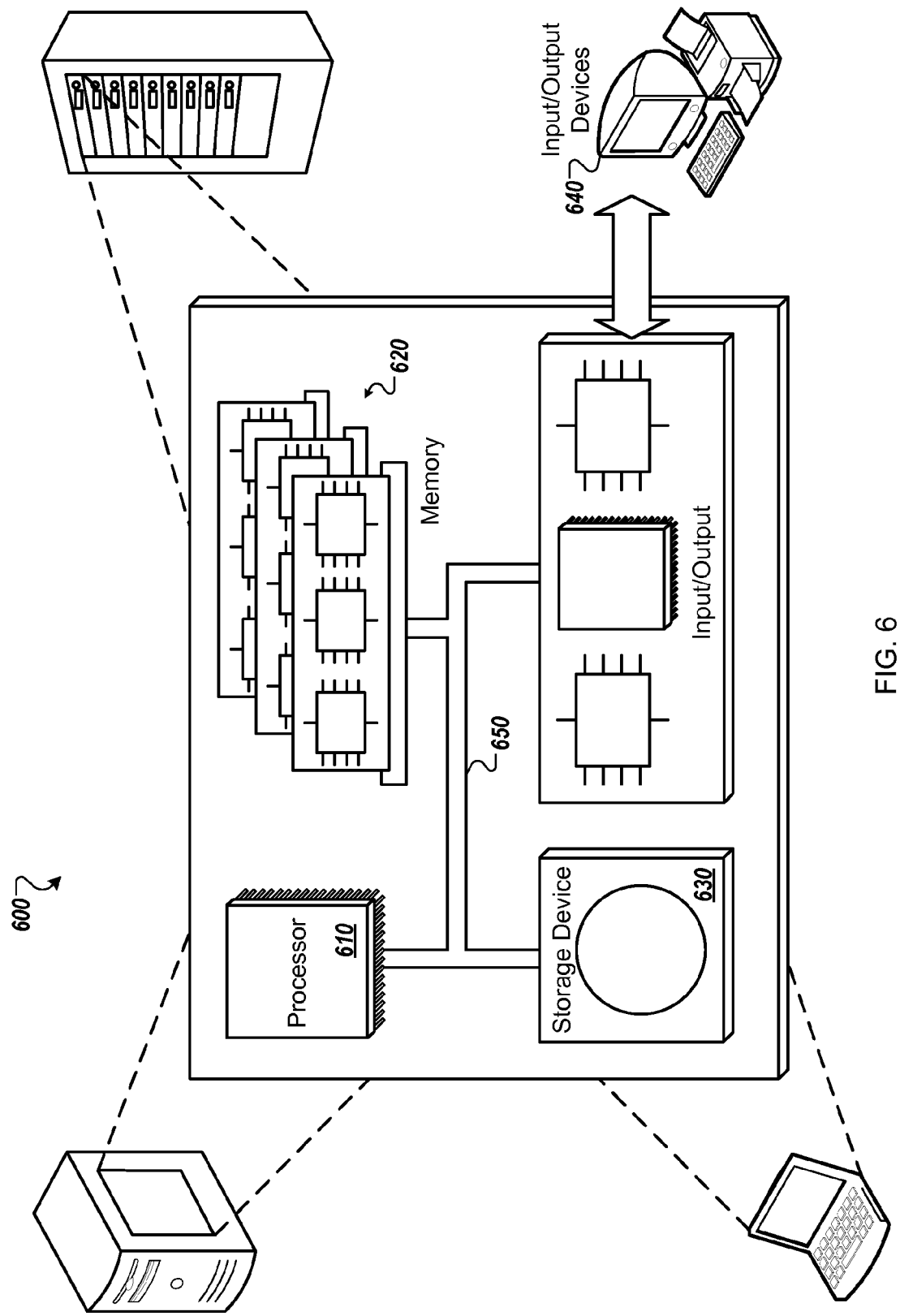
FIG. 6 is a block diagram of an example processing system.

An example of one such type of computer is shown in FIG. 6, which shows a block diagram of a programmable processing system 600 suitable for implementing apparatus or performing methods of various aspects of the subject matter described in this specification. The system 600 includes a processor 610, a random access memory (RAM) 620, a storage device 630, and an input/output (I/O) controller 640 coupled by a processor (CPU) bus 650. The system 600 can be preprogrammed, in ROM, for example, or it can be programmed (and reprogrammed) by loading a program from another source (for example, from a floppy disk, a CD-ROM, or another computer).

The storage device 630 suitable for storing executable computer programs, including programs embodying aspects of the subject matter described in this specification, and data including digital photographs, user identifiers, face area information, user relationships, affinity scores, quality scores, information that associates user identifiers with digital photographs, and other appropriate data.

The I/O controller 640 receives and transmits data (e.g., stills, pictures, movies, and animations for importing into a composition) in analog or digital form over communication links such as a serial link, local area network, wireless link, and parallel link.

Also coupled to the I/O controller 640 are output devices 660 which in various embodiments can include a display, a keyboard, a printer, and other input and output peripherals.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer implemented method, comprising:
receiving television broadcast data for a plurality of television channels, the television broadcast data having programming portions during which television programming is aired, and advertising portions during which advertisements are aired, and including caption data that includes text that corresponds to audio content of the programming portions and advertising portions and frame data defining video frames;
storing the caption data in a data store and indexing the caption data by time and channel, the time corresponding to a time the caption data was received in the broadcast data and the channel specifying a channel on which the stored caption data was provided in the broadcast data;
storing frame data of video frames in the data store and indexing each video frame by time and channel, the time corresponding to a time the video frame was received in the broadcast data and the channel specifying a channel on which the video frame was provided in the broadcast data;
identifying, from the caption data in the data store, caption data that has been received at least a threshold number of times and received over at least a threshold number of channels as repeated caption data;
identifying, from the index times and channels of the repeated caption data, the advertisement portions of the broadcast data;
selecting video frames indexed at times and channels that that correspond to the times and channels of the advertisement portions;
providing the selected video frames to a video processing system that identifies advertising objects in the video frame data and receiving from the video processing system the advertising objects; and
for each advertising object, associating the advertising object with the repeated caption data having times and channel indices that match the time and channel index of the video frame from which the advertising object was identified.

2. The method of claim 1, wherein the advertising objects include logo text identified from one or more of optical character recognition or visual similarity measurements, and text identified from optical character recognition.

3. The method of claim 1, wherein the caption data is closed caption data.

4. The method of claim 1, wherein the caption data is subtitle text data.

5. The method of claim 1, wherein identifying caption data that has been received at least a threshold number of times and received over at least a threshold number of channels as repeated caption data comprises identifying caption data that has been received at least the threshold number of times on each of the at least threshold number of channels.

6. The method of claim 1, wherein identifying, from the index times and channels of the repeated caption data, the advertisement portions of the broadcast data comprises:
for each channel, identifying sets of contiguous index times of the repeated caption data; and
padding each set of contiguous index times by a beginning padding time and ending padding time.

7. The method of claim 1, further comprising:
comparing caption data from received television broadcast data to the association of the advertising object and repeated caption data; and
identifying an airing of an advertisement in the broadcast data from a match of repeated caption data to the caption data of the broadcast data.

8. The method of claim 7, further comprising:
identifying supplemental advertising information from the matching repeated caption data and the advertising object data associated with the matching repeated caption data; and
providing the supplemental advertising data for conjunctive display with the broadcast data.

9. The method of claim 7, further comprising:
identifying supplemental advertising information from the matching repeated caption data and the advertising object data associated with the matching repeated caption data; and
providing the supplemental advertising data to a user device for display separate from the broadcast data.

10. A system comprising:
one or more computers operable to:
receive television broadcast data for a plurality of television channels, the television broadcast data having programming portions during which television programming is aired, and advertising portions during which advertisements are aired, and including caption data that includes text that corresponds to audio content of the programming portions and advertising portions and frame data defining video frames;
store the caption data in a data store and indexing the caption data by time and channel, the time corresponding to a time the caption data was received in the broadcast data and the channel specifying a channel on which the stored caption data was provided in the broadcast data;
store frame data of video frames in the data store and indexing each video frame by time and channel, the time corresponding to a time the video frame was received in the broadcast data and the channel specifying a channel on which the video frame was provided in the broadcast data;
identify, from the caption data in the data store, caption data that has been received at least a threshold number of times and received over at least a threshold number of channels as repeated caption data;
identify, from the index times and channels of the repeated caption data, the advertisement portions of the broadcast data;
select video frames indexed at times and channels that that correspond to the times and channels of the advertisement portions;
provide the selected video frames to a video processing system that identifies advertising objects in the video frame data and receiving from the video processing system the advertising objects; and for each advertising object, associate the advertising object with the repeated caption data having times and channel indices that match the time and channel index of the video frame from which the advertising object was identified.

11. The system of claim 10, wherein the advertising objects include logo text identified from one or more of optical character recognition or visual similarity measurements, and text identified from optical character recognition.

12. The system of claim 10, wherein the caption data is closed caption data.

13. The system of claim 10, wherein identifying caption data that has been received at least a threshold number of times and received over at least a threshold number of channels as repeated caption data comprises identifying caption data that has been received at least the threshold number of times on each of the at least threshold number of channels.

14. The system of claim 13, wherein identifying, from the index times and channels of the repeated caption data, the advertisement portions of the broadcast data comprises:
   for each channel, identifying sets of contiguous index times of the repeated caption data; and
   padding each set of contiguous index times by a beginning padding time and ending padding time.

15. The system of claim 13, wherein the one or more computers are further operable to:
   compare caption data from received television broadcast data to the association of the advertising object and repeated caption data; and
   identify an airing of an advertisement in the broadcast data from a match of repeated caption data to the caption data of the broadcast data.

16. The system of claim 15, wherein the one or more computers are further operable to:
   identify supplemental advertising information from the matching repeated caption data and the advertising object data associated with the matching repeated caption data; and
   provide the supplemental advertising data for conjunctive display with the broadcast data.

17. The system of claim 15, wherein the one or more computers are further operable to:
   identify supplemental advertising information from the matching repeated caption data and the advertising object data associated with the matching repeated caption data; and
   provide the supplemental advertising data for conjunctive display with the broadcast data.

18. A non-transitory computer storage medium encoded with a computer program, the program comprising instructions that when executed by data processing apparatus cause the data processing apparatus to perform operations comprising:
   receiving television broadcast data for a plurality of television channels, the television broadcast data having programming portions during which television programming is aired, and advertising portions during which advertisements are aired, and including caption data that includes text that corresponds to audio content of the programming portions and advertising portions and frame data defining video frames;
   storing the caption data in a data store and indexing the caption data by time and channel, the time corresponding to a time the caption data was received in the broadcast data and the channel specifying a channel on which the stored caption data was provided in the broadcast data;
   storing frame data of video frames in the data store and indexing each video frame by time and channel, the time corresponding to a time the video frame was received in the broadcast data and the channel specifying a channel on which the video frame was provided in the broadcast data;
   identifying, from the caption data in the data store, caption data that has been received at least a threshold number of times and received over at least a threshold number of channels as repeated caption data;
   selecting video frames indexed at times and channels that that correspond to the times and channels of the repeated caption data;
   providing the selected video frames to a video processing system that identifies advertising objects in the video frame data and receiving from the video processing system the advertising objects; and
   for each advertising object, associating the advertising object with the repeated caption data having times and channel indices that match the time and channel index of the video frame from which the advertising object was identified.

19. The computer storage medium of claim 18, wherein the advertising objects include logo text identified from one or more of optical character recognition or visual similarity measurements, and text identified from optical character recognition.

20. The computer storage medium of claim 18, wherein identifying caption data that has been received at least a threshold number of times and received over at least a threshold number of channels as repeated caption data comprises identifying caption data that has been received at least the threshold number of times on each of the at least threshold number of channels.

21. The computer storage medium of claim 18, the operations further comprising:
   comparing caption data from received television broadcast data to the association of the advertising object and repeated caption data; and
   identifying an airing of an advertisement in the broadcast data from a match of repeated caption data to the caption data of the broadcast data.

22. The computer storage medium of claim 21, the operations further comprising:
   identifying supplemental advertising information from the matching repeated caption data and the advertising object data associated with the matching repeated caption data; and
   providing the supplemental advertising data for conjunctive display with the broadcast data.

* * * * *

UNITED STATES PATENT AND TRADEMARK OFFICE
CERTIFICATE OF CORRECTION

PATENT NO. : 8,196,164 B1
APPLICATION NO. : 13/275025
DATED : June 5, 2012
INVENTOR(S) : Ant Oztaskent et al.

Page 1 of 1

It is certified that error appears in the above-identified patent and that said Letters Patent is hereby corrected as shown below:

Title Page, Abstract (57), Line 8, after "that" delete "that".

Column 15, Lines 44-45, in Claim 1, after "that" delete "that".

Column 16, Line 61, in Claim 10, after "that" delete "that".

Column 18, Lines 19-20, in Claim 18, after "that" delete "that".

Signed and Sealed this
Thirtieth Day of October, 2012

David J. Kappos
*Director of the United States Patent and Trademark Office*